United States Patent
Medina, III et al.

(10) Patent No.: US 12,361,367 B1
(45) Date of Patent: Jul. 15, 2025

(54) SYSTEMS AND METHODS FOR TARGETED DELIVERY OF SUPPLIES DURING EMERGENCY EVENTS

(71) Applicant: United Services Automobile Association (USAA), San Antonio, TX (US)

(72) Inventors: Reynaldo Medina, III, San Antonio, TX (US); Oscar Guerra, San Antonio, TX (US); Bradly Jay Billman, Celina, TX (US); Arthur Quentin Smith, Fredericksburg, TX (US); Qunying Kou, San Antonio, TX (US); Breanna Nicole Allerkamp, Boerne, TX (US); Daniel Diaz, San Antonio, TX (US); Justin Royell Nash, Little Elm, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/975,785

(22) Filed: Oct. 28, 2022

(51) Int. Cl.
 *G06Q 10/083* (2024.01)
(52) U.S. Cl.
 CPC .................................. *G06Q 10/083* (2013.01)
(58) Field of Classification Search
 CPC .................................................... G06Q 10/083
 See application file for complete search history.

(56) References Cited

U.S. PATENT DOCUMENTS

| | | | | |
|---|---|---|---|---|
| 9,321,531 B1* | 4/2016 | Takayama | .............. | B64C 39/024 |
| 10,078,808 B1* | 9/2018 | Sibon | .................... | B64C 39/024 |
| 10,395,544 B1* | 8/2019 | Harris | ..................... | B64F 1/007 |
| 10,997,544 B1* | 5/2021 | Bar-Zeev | .............. | B64C 39/024 |
| 11,634,226 B1* | 4/2023 | Piedmonte | .......... | G06Q 30/0633 244/17.13 |
| 2015/0317597 A1* | 11/2015 | Shucker | ............... | G05D 1/0202 235/375 |
| 2016/0068264 A1* | 3/2016 | Ganesh | ................ | G05D 1/0676 701/4 |
| 2018/0130159 A1* | 5/2018 | High | .................... | G06Q 10/083 |
| 2019/0130770 A1* | 5/2019 | Di Benedetto | ....... | B64C 39/024 |
| 2021/0253264 A1* | 8/2021 | Bosma | ..................... | B64D 1/16 |

OTHER PUBLICATIONS

Young Jeong, Ho. Hybrid Delivery System: Delivery Schedule Optimization and Comparative Analysis. Purdue University, May 2022. (Year: 2022).*

* cited by examiner

*Primary Examiner* — George Chen
(74) *Attorney, Agent, or Firm* — Fletcher Yoder, P.C.

(57) ABSTRACT

A supply delivery system includes one or more processors and one or more memory devices storing instructions executable by the one or more processors to cause the one or more processors to instruct an aerial vehicle to travel within a geographical area, instruct an imaging device carried by the aerial vehicle to capture image data as the aerial vehicle travels through the geographical area, analyze the image data to identify an identification code on a physical target, instruct the aerial vehicle to dispense one or more items from the aerial vehicle at or near the physical target.

20 Claims, 3 Drawing Sheets

SYSTEMS AND METHODS FOR TARGETED DELIVERY OF SUPPLIES DURING EMERGENCY EVENTS

CROSS-REFERENCE TO RELATED APPLICATION

This application claims priority to and the benefit of U.S. Provisional Application No. 63/273,325, entitled "SYSTEMS AND METHODS FOR TARGETED DELIVERY OF SUPPLIES DURING EMERGENCY EVENTS" and filed on Oct. 29, 2021, the disclosure of which is incorporated by reference herein in its entirety for all purposes.

BACKGROUND

The present disclosure relates generally to systems and methods for targeted delivery of supplies. The present disclosure relates more specifically to systems and methods of operating an aerial drone to detect a physical code corresponding to one or more areas for targeted delivery of the supplies.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

During emergency events (e.g., flooding, winter storm, earthquake) residents who live within certain areas affected by the emergency events may be unable to travel to receive aid and/or obtain basic supplies (e.g., food, water, first aid supplies) due to road conditions or various other reasons. Further, emergency crews may be unable to reach certain areas to provide the basic supplies. This may lead to delays in residents receiving the basic supplies they may need during and/or after the emergency event. Additionally, residents may experience poor and/or no long-range communication service (e.g., Internet or cellular service, such as 5G) during and/or after the emergency event. This may prevent the residents them from using their cellular device and/or other device to request the basic supplies, and may further lead to delays in the residents communicating with emergency providers (e.g., Emergency Medical Services [EMS], Fire Departments) to communicate that certain supplies and/or items are needed at certain locations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a supply delivery system includes one or more processors and one or more memory devices storing instructions executable by the one or more processors to cause the one or more processors to instruct an aerial vehicle to travel within a geographical area, instruct an imaging device carried by the aerial vehicle to capture image data as the aerial vehicle travels through the geographical area, analyze the image data to identify an identification code on a physical target, instruct the aerial vehicle to dispense one or more items from the aerial vehicle at or near the physical target.

In certain embodiments, a method of operating a supply delivery system includes instructing, via one or more processors, an aerial vehicle to travel within a geographical area in response to identifying an event in the geographical area. The method also includes instructing, via the one or more processors, an imaging device carried by the aerial vehicle to capture image data as the aerial vehicle travels through the geographical area. The method further includes analyzing, at the one or more processors, the image data to identify an identification code on a physical target. The method further includes instructing, via the one or more processors, the aerial vehicle to dispense one or more items at or near the physical target.

In certain embodiments, a supply delivery system includes one or more processors and one or more memory devices storing instructions executable by the one or more processors to cause the one or more processors to instruct an aerial vehicle to follow a flight path through a geographical area, instruct an imaging device carried by the aerial vehicle to capture image data as the aerial vehicle follows the flight path through the geographical area, analyze the image data to identify an identification code, access a user profile of a user associated with the identification code, identify one or more items based on the user profile, and instruct the aerial vehicle to dispense the one or more items from the aerial vehicle within a threshold distance of the identification code.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
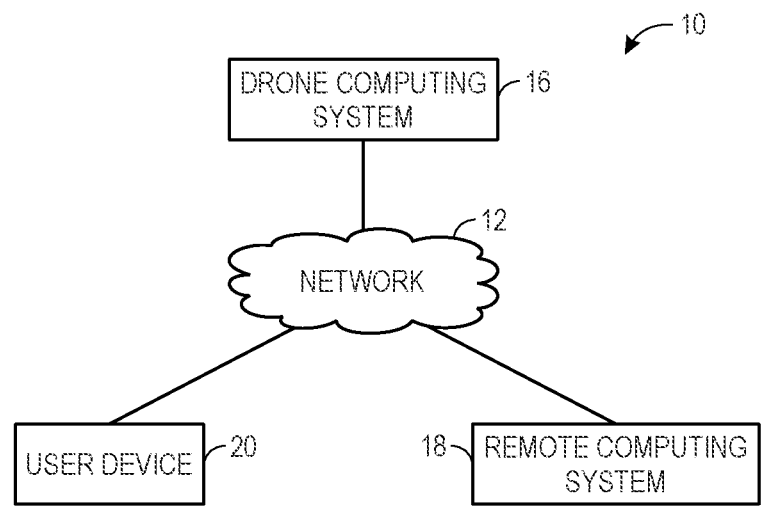
FIG. 1 illustrates a targeted delivery communication system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, during an event (e.g., an emergency event) in a geographical area, at least some residents in the geographical area may be unable to obtain supplies and/or notify crews to request supplies due to poor road conditions, poor cellular connections, or the like, in the geographical area being impacted by the event. Additionally, the poor road conditions during the event may prevent crews from delivering supplies to the residents in the geographical area being impacted by the event. However, it is now recognized that various advantages may be gained by enabling the residents and/or other users within the geographical area to display a physical target with a code that can be detected by an aerial drone system and/or to receive supplies via the aerial drone system at a location (e.g., near the physical target) during and/or after the event.

Accordingly, the present embodiments relate to targeted delivery of supplies (e.g., food, water, medical supplies) to residents and/or other users within a geographical area affected by an event, such as an emergency event. A user within the geographical area impacted by the event may possess and display a physical target that includes a code (e.g., quick response [QR] code, bar code, alphanumeric code, symbol, color pattern, or other readable code). In some embodiments, the code may be configured for capture and identification via a camera. However, in some embodiments, the code may be integrated into a tag (e.g., radio frequency identification tag) that is readable via another device (e.g., a reader). The physical target may be a blanket, tarp, flag, plate, or other suitable item, and the code may be printed or woven onto the physical target in a manner that enables easy display by the user at their location. The physical target may be flexible (e.g., foldable to facilitate storage) and/or rigid.

A drone (e.g., single-rotor drone, multi-rotor drone, fixed-wing drone, fixed-wing hybrid drone; unmanned aerial vehicle) carrying emergency items or any other supplies may be configured to scan the geographical area impacted by the event and identify (e.g., detect and read) the code on the physical target. The drone may receive inputs that indicate the geographical area and then use traditional navigation methods, such as a global positioning system [GPS] or directional navigation, to travel in the geographical area. In this way, the drone may be able to dispense the supplies at a location (e.g., near the physical target) without the need for crews to travel to the location during the event to dispense the supplies in-person, without the user attempting to travel to a store or other supply center, and/or without the user having access to wireless communications (e.g., long-range communications, such as Internet and/or cellular service).

It should be appreciated that the physical target may be an item that serves multiple purposes, such as the tarp and/or the blanket that can be used to display the code and to cover and protect the user from environmental conditions. Further, it should be appreciated that multiple users within the geographical area impacted by the event may each possess and display a respective physical target that includes a respective code (e.g., the codes may be the same, varied, or unique). Further, the term drone is used herein to facilitate discussion; however, it should be appreciated that the drone may be any type of aerial vehicle that is guided to fly through air via remote control (e.g., a human operator providing inputs at a remote location) and/or via autonomous control (e.g., executes preprogrammed flight paths; travels autonomously according to instructions stored locally on the drone and/or accessed from a remote computing system). In some cases, the disclosed techniques may be used with other types of vehicles, such as aerial vehicles that are locally controlled at least in some respects by a human operator carried by the drone, all-terrain vehicles or other ground-based vehicles that travel along ground, or the like.

Additionally or alternatively, a communication system (e.g., emergency communication system, such as an emergency services provider or hospital) may send one or more notifications to one or more electronic devices corresponding to the user and/or the multiple users in the geographical area impacted by the event. The one or more notifications may direct each user to display their physical target at their location. The drone may then scan the geographical area affected by the event for any codes. In some embodiments, the drone may receive additional communication details via Bluetooth connection to the one or more electronic devices. The additional communication details may provide verification and/or additional location coordinates to facilitate drop-off of supplies, requests for specific items, and the like. The drone may then dispense the supplies, such as nearby the physical target.

With the foregoing in mind, FIG. 1 illustrates a targeted delivery communication system 10, in accordance with an embodiment of the present disclosure. The targeted delivery communication system 10 may include a network 12 that facilitates communication between a drone computing system 16, a remote computing system 18, and one or more user devices 20 to enable supplies to be delivered to a location during and/or after an event (e.g., emergency event, such as flooding, winter storm, earthquake). The drone computing system 16 may be an on-board computing system local to each drone of the one or more drones used in the delivery communication system 10. The remote computing system 18 may be associated with one or more emergency response providers and/or other providers (e.g., an insurance company), and/or the one or more user devices 20 may be associated with one or more users in a geographical area impacted by the event.

As discussed above, the event may prevent providers from physically reaching the one or more users in the geographical area impacted by the event. In the event that the providers cannot reach the geographical area impacted by the event or for any of a variety of other reasons, the remote computing system 18 may send a notification, via the network 12, to the one or more user devices 20 associated with the one or more users in the geographical area. The notification may include an instruction (e.g., direction and/or recommendation) to display a physical target (e.g., blanket, tarp, flag) at their current location and/or at a particular area at their current location (e.g., a driveway of their residence; on top of their vehicle).

The physical target may include a code (e.g., readable code; printed onto the physical target) that is used to facilitate supply delivery via a drone drop-off operation. In some embodiments, the user may create a code (e.g., readable code; numeric code; alphanumeric code; symbol) on the physical target or other surface. For example, the notification may include an image of a code for visualization via their user device 20, and then the user may draw a copy of the code onto a ground surface (e.g., driveway street) around the user location and/or onto a material surface (e.g., blanket, cloth) to create the physical target with the code. For example, the user may use any available drawing supplies (e.g., crayons, markers, spray paint) and/or objects (e.g., sticks, clothing, paper) to create the code on the ground and/or the material surface. The physical target and/or surface used to display the code may also include a spotlight and/or reflective marker to enable the drone to detect the code in low-light and/or nighttime settings. The spotlight and/or reflective marker may also enable the drone to detect the code more easily in debris heavy areas and/or smoke filled areas during the event. In some cases, the physical target may include an opaque material (e.g., fabric) and cut out sections that form the code (e.g., openings; template) that is visible to the drone, particularly when a light is placed under or behind the physical target at night or in low-light (e.g., the light is visible only through the cut out sections; the light makes the cut out sections readable by the drone).

The user may have received the physical target at an earlier date before the event and may be given instructions to retrieve the physical target during the event. For example, the user may have received the physical target via a registration process with an insurance company. As a more specific example, the user may have received the physical target and/or be eligible to receive support from the targeted delivery communication system 10 in response to completing the registration process for insurance and/or obtaining insurance (e.g., health insurance, life insurance, property insurance) from the insurance company. In such cases, the code on the physical target may be assigned to the user (e.g., stored in association with a name or other identifier of the user in a database), the physical target may be mailed to the user, and the user may be enrolled as an eligible participant in the targeted delivery communication system 10.

Additionally, the remote computing system 18 may communicate information to the one or more user devices 20 about optimal and/or efficient places to position the code and/or the physical target using a cellular and/or other wireless network. The remote computing system 18 may send a request to the user device 20 to position the code at a higher elevation (e.g., on top of a vehicle, out of a window) to increase visibility of the code. The remote computing system 18 may be part of an emergency response network, emergency provider network, insurance provider network, or the like. The remote computing system 18 may be able to broadcast notifications, via the network 12, to all user devices 20 within the geographical area. The remote computing system 18 may also send updates regarding delivery time of the supplies, emergency services, safety instructions, and the like. In some embodiments, the network connection of the user device 20 may be weak due to the event or for any other reasons. Accordingly, the user device 20 may include pre-loaded instructions detailing how to create the code and/or position the code at the current location of the user. For example, the user device 20 may present the pre-loaded instructions upon the user opening an application on the user device 20. In some embodiments, the remote computing system 18 may send the notifications prior to the event, such as in response to a weather forecast that indicates an upcoming severe weather event that may cause poor communications and/or road conditions. In some embodiments, the one or more drones 50 may communicate (e.g., send the notifications and/or instructions) to the one or more user devices 20 within the geographical area (e.g., as the one or more drones 50 travel through the geographical area and as the one or more user devices 20 are positioned within range of respective communication devices of the one or more drones 50). For example, during a first pass or during each pass through the geographical area, the one or more drones 50 may broadcast the notifications and/or the instructions to the one or more user devices 20. During a second pass or during each pass through the geographical area, the one or more drones 50 may scan for any codes in the geographical area. Additionally, the drone computing systems 16 may include light detection and ranging (LIDAR) sensors that may enable the drone to detect ranges and/or positions of certain objects and/or the user, and to navigate more effectively to position the drone at the physical target for the supply drop-off.

Further, the remote computing system 18 may send a notification to the one or more drone computing systems 16 corresponding to the one or more drones to maneuver to the geographical area associated with the event. The remote computing system 18 may also send instructions to a central drone control system, that may be a base system to coordinate all drones, set initial flight commands in a coordinated manner, or the like. The instructions sent to the one or more drone computing systems 16 may direct each of the drones to collect image data, via one or more imaging devices (e.g., cameras) of the one or more drones, of the geographical area to identify any codes within the geographical area. The remote computing system 18 may also send instructions to the drone computing system 16 to deposit supplies in response to detection of each code, such as within a respective threshold distance of each code. The drone computing system 16 may receive the information relating to the geographical area and may maneuver throughout the geographical area based on the instructions.

As discussed herein, each drone may have its own on-board drone computing system 16 that receives commands from the remote computing system 18 and/or a central drone control system. The commands may direct the one or more drones to scan (e.g., collect image data) for the codes within the geographical area. The drone computing system 16 of each drone may enable the drone to deposit supplies at the location, such as nearby the code, in response to detection of the code based on analysis of the collected image data by the drone computing system 16. The drone computing system 16 may also send a notification to the remote computing system 18 that the supplies have been deposited at the location, such as nearby the code, along with other related information (e.g., location coordinates for the code and/or drop-off of the supplies; data sent from the one or more user devices 20 via short-range communications, such as Bluetooth). This may enable the drone computing system 16 to notify the remote computing system 18 that the supplies have been successfully delivered to the location associated with the user.

In some embodiments, the drone computing system 16 of each drone may use short-range communications (e.g., via Bluetooth connectivity) to connect with the user devices 20 within the geographical area to communication information (e.g., the notifications) and/or to receive more specific location information and/or to receive other information (e.g., a status of the user, such as a health status, supplies needed or desired, and/or identifying information of persons at the location of the code). For example, a drone may be within short-range communication of a code, but may have trouble moving to the exact location of the code using only the imaging device of the drone. The user device 20, via the short-range communication or Bluetooth connection, may send further location coordinates and/or location information (e.g., based on signal strength) to the drone computing system 16, which may enable the drone to more efficiently locate the code within the geographical area.

Additionally, the user device 20 via the short-range communication or Bluetooth connection, may send additional information, such as a request for specific items, to the drone. For example, the user may input the request for the specific items via an application on the user device 20, and the user device 20 may communicate this to the drone computing system 16 of the drone that is within range of the user device 20. Additionally, the drone computing system 16 may communicate the additional information with the remote computing system 18 via the network 12 while the drone is nearby the location of the code, while the drone is traveling within the geographical area, and/or while the drone is in range of the remote computing system 18. In some embodiments, the drone may store the additional information and provide the additional information to the remote computing system 18 upon connection of the drone computing system 16 to the remote computing system 18, such as after repair of the long-range communication network (e.g., Internet) and/or upon the drone traveling out of the geographical area to restore connection to the remote computing system 18. However, in some embodiments, the user device 20 may communicate the additional information to the remote computing system 18, which may then transmit the additional information to the drone computing systems 16 corresponding to the one or more drones to facilitate delivery of the requested items. The instructions may include instructions (e.g., link coordinates to the items; pre-programmed flight path) to deposit the items at the physical target within the geographical area corresponding to the user device 20 that requested the items. It should be understood, that any available mode of communication (e.g., Bluetooth connection, Internet connection, cellular service connection) may be used to communicate with the user device 20 during the event.

It should be appreciated that the drone computing system 16 may also receive confirmation via the user device 20, such as via the Bluetooth connection, after delivery that the supplies to the user associated with the user device 20. The drone computing system 16 may send a notification to the remote computing system 18 that the user has confirmed receipt of the supplies (e.g., upon receipt of the confirmation, if communication between the drone computing system 16 and the remote computing system 18 is intact; or automatically upon being within communication range of the remote computing system 18 or other system that is communicatively coupled to the database, such as upon return of the drone 50 to a base station or other location outside of the geographical area). In this way, the drone computing system 16 may at least temporarily store the confirmation so that this can be provided to interested parties (e.g., even when long-range communication services are out of order). The remote computing system 18 may then notify emergency service providers and/or other provides (e.g., the insurance company) that the supplies have been received by the one or more users associated with the user device 20. Further, the remote computing system 18 may update a database that stores user information to indicate that the user has received the supplies. The database may include user profile information corresponding to a name or other identifier of the user, household members of the user, age of the user and/or household members, address of the user, health conditions of the user and/or household members, medical equipment and/or medication used by the user and/or household members, and the like. The database related to the user may also be queried via the remote computing system 18 to determine supplies (e.g., medical equipment, medication, baby formula) the user may need during the event, which may facilitate supply of appropriate items even in the event of poor network connection with the user device 20. In some cases, the user may prepare or create a supply list prior to the event (e.g., during the registration process and/or in response to the weather forecast showing an upcoming severe weather event) and/or the user may be assigned a supply list prior to the event (e.g., during the registration process and/or in response to the weather forecast; based on the user profile information and/or characteristics of the event). Then, the remote computing system 18 may default to providing the items on the supply list in the event that the remote computing system 18 is unable to establish communication and/or receive information from the user device 20 during the event. The supplies may be packaged based on the event according to information supplied by the remote computing system 18. For example, during flood conditions the supplies may be packaged in waterproof packaging that includes a floatation device for the packaging. Further, the drone drop-off points may be determined by an operator (e.g., rescue worker), and communicated to the remote computing system 18 by the operator. The remote computing system 18 may also utilize artificial intelligence and machine learning algorithms to set drop-off locations for the supplies based on past disaster areas.

In some embodiments, the drone computing system 16 may be able to match the code detected via the imaging device of the drone with the user profile information (e.g., the code is matched to the user in the database; the code is unique to the user). This may enable the drone to provide certain items at the location nearby the code for the user and other items at other locations nearby the codes for other users (e.g., automated personalized deliveries in response to the event and detection of the codes). Additionally, the drone computing system 16 may notify the remote computing system 18 of the items that are dropped off at the locations nearby the codes, and the remote computing system 18 may then update the records to include the supplies the user received via the drone delivery.

Additionally, the drone computing systems 16 may enable the drones to be remotely controlled and/or programmed to carry out certain actions, such as to scan for codes and deliver items in response to detection of the codes. In such cases, the drones, via the drone computing system 16, may locally store and/or access user profiles in the remote computing system 18 that associates the codes with the users and their supply lists so that the drones may deliver the correct supplies as they detect the codes (e.g., even without communication between the drones and the remote computing system 18 as the drones travel through the geographical area). Further, the one or more drones may deliver user-specific supplies (e.g., based on a unique code associated with the user profile of the user). In other embodiments, the one or more drones may instead deliver a first set of supplies to one type of code, a second set of supplies to another type of code, and so on. For example, one type of code may indicate supplies for a single person, another type of code may indicate supplies for two people, and so forth. As another example, one type of code may indicate a complete set of premium supplies (for users that signed up for a premium package), another type of code may indicate a smaller set of basic supplies (for users that signed up for a basic package), and so forth.

In some embodiments, each user may receive a unique code or users may share codes (e.g., each member in a family has the same code) and the supplies may be distributed accordingly. In some cases, all users may have the same code that is not unique, and the drone may deliver the same supplies upon detection of any code. In some cases, all users may have the same code that is not unique, and the drone may deliver the supplies based on identifying the user in some other way (e.g., the Bluetooth communications with the request for certain items, the location is known to be a residence of the user, interaction between the drone and the user). Furthermore, regardless of whether the code is unique or not, the drone computing system 16 may facilitate a multi-factor authentication before dropping off the supplies. For example, the drone may only drop off the supplies upon detection of the code, via the drone computing system 16, and an additional authenticator, such as communication with the user device 20 via the Bluetooth communications, matching the location to the residence of the user, matching images of the vehicle of the user or a face of the user, receipt of a spoken or keyed password from the user at the drone, or the like may be used. As noted herein, the drone computing system 16 may not be able to maintain communication with the remote computing system 18, so the drone computing system 16 may store such identifying information on-board (e.g., the identifying information for users known to reside or be in the geographical area at the time of the event) and/or travel back and forth to the remote computing system 18 to confirm the identifying information to carry out the multi-factor authentication. While aspects are described as being distributed between the drone computing system 16, the remote computing system 18, and the user device 20 in certain ways to facilitate discussion, it should be appreciated that processing circuitry in each of these systems and devices may work together in any suitable manner to carry out the disclosed techniques.

Figure 2:
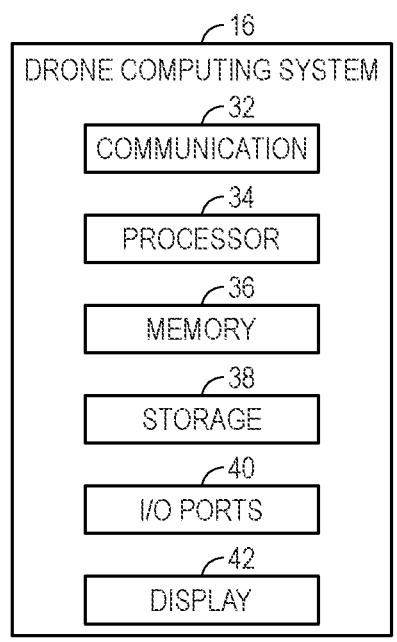
FIG. 2 illustrates a drone computing system that may be used in the targeted delivery communication system of FIG. 1, in accordance with an embodiment of the present disclosure.

Additionally, the drone computing system 16 may include multiple components, as detailed in FIG. 2. It should be appreciated that the remote computing system 18 and/or the user device 20 may include the same or similar components. The drone computing system 16 may include any suitable computer device, such as a general-purpose personal computer, a laptop computer, a tablet computer, a mobile computer, or the like that is configured in accordance with present embodiments. The drone computing system 16 may include various types of components that may assist the drone computing system 16 in performing various types of tasks and operations described herein. For example, the drone computing system 16 may include a communication component 32, a processor 34, a memory 36, a storage 38, input/output (I/O) ports 40, a display 42, and the like. The communication component 32 may be a wireless or wired communication component that may facilitate communication between the drone computing system 16, the data sources, and various other computing systems via a network, the Internet, or the like. The processor 34 may be any type of computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. As used herein, applications may include any suitable computer software or program that may be installed onto the drone control system 48 and executed by the processor 34. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components, such as input devices (e.g., keyboard, mouse), sensors, input/output (I/O) modules, and the like. The display 42 may operate as a human machine interface (HMI) to depict visualizations associated with software or executable code being processed by the processor 34. In one embodiment, the display 42 may be a touch display capable of receiving inputs from a user of the drone control system 48. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the drone computing system 16. It should be noted that the components described herein with regard to the drone computing system are examples and the drone computing system 16 may include additional or fewer components relative to the illustrated embodiment. The drone computing system 16 may also include one or more on-board cameras that may be used to collect image data.

In certain embodiments, the drone computing system 16 may be communicatively coupled to the network 12, which may include collections of computing systems, the Internet, an Intranet system, or the like. The network 12 may facilitate communication between the drone computing system 16 and various other data sources. For instance, the network 12 may be communicatively coupled to a mobile device (e.g., the user device 20) and/or remote computing system 18 to enable notifications to the user and/or provider associated with the remote computing system 18. The notifications may include an estimated delivery time of supplies, location for supplies delivery, and the like. In some embodiments, the network 12 may be communicatively coupled to one or more databases, which may store data including data related to the user location within the geographical area affected by the emergency event, user profiles, and the like. In addition, the one or more databases may include an exposed application programming interface (API) that provides data services regarding user location services. The one or more databases may conduct ongoing updates to add additional user profile location data to the one or more databases. The one or more databases may be utilized for drone delivery coordination, as referenced in FIG. 3.

Figure 3:
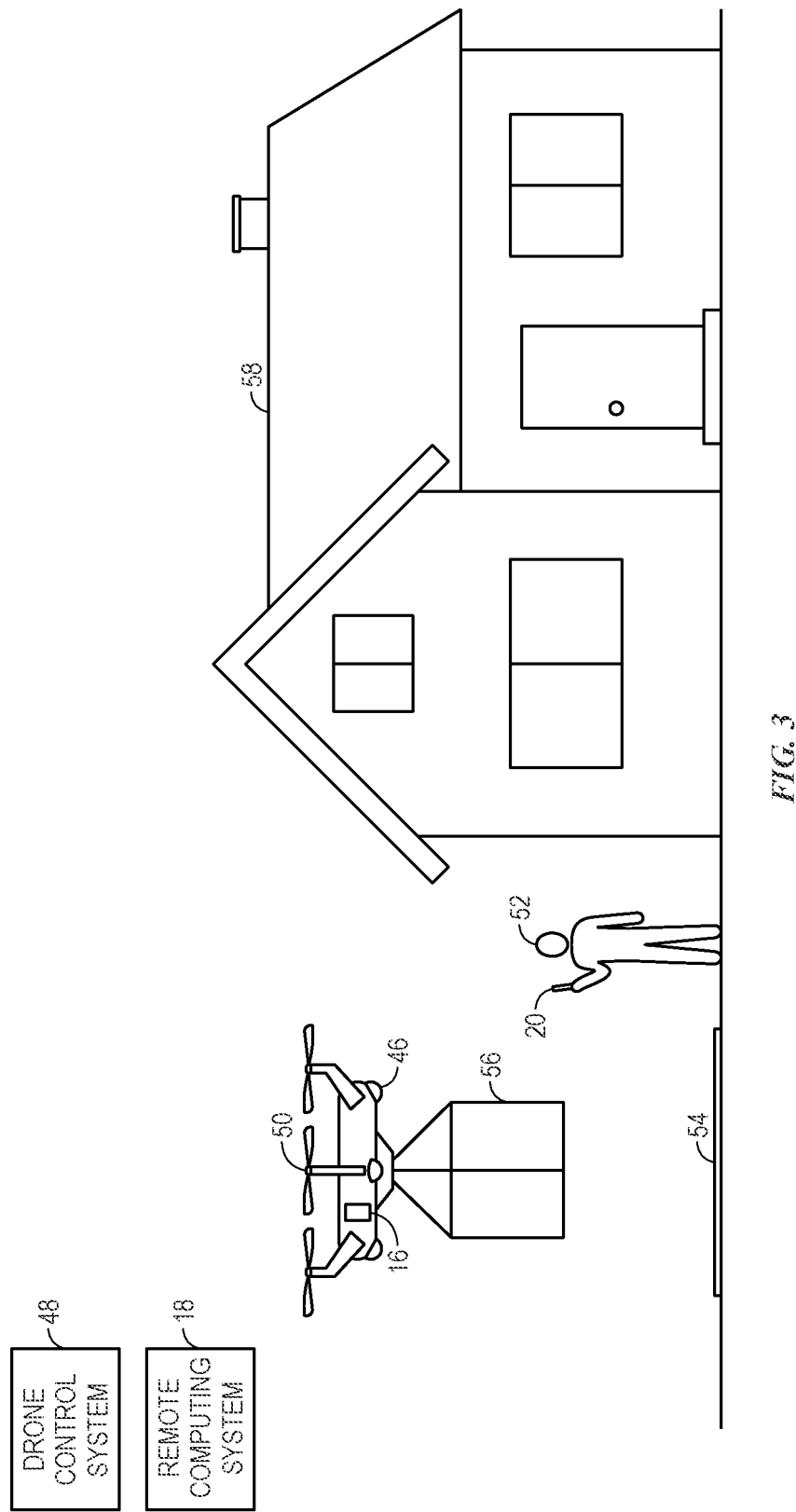
FIG. 3 illustrates a user interaction with the targeted delivery communication system of FIG. 1 to receive supplies via a drone drop-off operation, in accordance with an embodiment of the present disclosure.

With reference to FIG. 3, a user 52 may interact with the targeted delivery communication system 10 to receive items 56 via drone drop-off operations, in accordance with an embodiment of the present disclosure. As mentioned herein, the user 52 may be located within a geographical area affected by a disaster or some other event and may receive and/or access instructions to position a physical target 54 (e.g., blanket, tarp, flag) at their location. The instructions may be sent to the user device 20 associated with the user from the remote computing system 18 associated with a response provider. Additionally, the user 52 may have instructions pre-loaded onto their user device 20 detailing how to position the physical target 54 during the event. The instructions may direct the user 52 to position the physical target 54 within a threshold distance of their location, a residence 58 associated with the user 52, or any other location associated with the user 52 at the time of the event. Further, the instructions may direct the user 52 to position the physical target 54 at an elevation by positioning the physical target 54 on a roof and/or a hood of a vehicle, a balcony, a ledge, or other elevated area around the user 52. In some cases, the user 52 may initiate placement of the physical target 54 without any current and/or recent instructions from the user device 20. For example, the user 52 may place the physical target 54 at any open and/or exposed surface, such as in a driveway of their residence 58, based on instructions written directly on the physical target 54 and/or instructions provided to the user 52 in some other manner.

As discussed above, the physical target 54 may include a QR code or other readable code (e.g., identifying markings, signature, images of location, images of the user 52), which may be associated with a user identifier and/or user profile. In some embodiments, the user profile may be stored on and/or accessible to an on-board drone computing system 16 of a drone 50. The drone 50 may be directed, such as via the drone computing system 16, to scan a geographical area for the physical target 54. In some embodiments, the drone 50 may include one or more cameras 46 that collect image data. The drone computing system 16 may analyze the collected image data to identify the code displayed on the physical target 54. In some cases, the code may only indicate a proper location for drop-off of items 56 and may not indicate the user profile. However, in some cases, the code may indicate the proper location for drop-off of the items 56 and also indicate the user profile (e.g., the code is a unique identifier that can be used by the drone computing system 16 and/or the remote computing system 18 to look up the user information in the user profile). Furthermore, in some cases, the code may indicate the proper location for drop-off of the items 56 and the drone computing system 16 may determine the location of the code (e.g., using a sensor, such as a global positioning system sensor of the drone 50). The drone computing system 16 may use the location to look up the user profile and/or may send the location to the remote computing system 18 to look up the user profile. In some embodiments, the drone computing system 16 and/or the remote computing system 18 may utilize the location to associate the location with a residence of the user 52 and update the user profile corresponding to the user 52 to include that the user 52 has received the items 56.

In some embodiments, the drone 50 may enable a short-range (e.g., Bluetooth) connection to be established with the user device 20, via the drone computing system 16. The drone computing system 16 may send a request to the user device 20 to provide additional location data corresponding to the physical target 54, such as via the short-range connection. The user device 20 may then respond by activating the short-range connection and/or the user device 20 may automatically establish the short-range connection with the drone 50 when the drone 50 is within a range of the user device 20 (e.g., the range of the short-range connection of the user device 20). The drone computing system 16 may receive and analyze the additional location information and may direct the drone 50 to maneuver to the physical target 54 based on the additional location information. The drone computing system 16 may identify the code, via analysis of the collected image data by the camera 46 of the drone 50. In response to identifying the code, the drone computing system 16 may instruct the drone 50 to deposit the items 56 at the physical target 54 or within a threshold distance of the physical target 54 (or code on the physical target 54). In some embodiments, the user 52 may confirm receipt of the items 56 by sending a confirmation, via the user device 20, to the drone computing system 16 and/or the remote computing system 18 to notify the response provider that the items 56 have been received by the user 52. The user 52 may also provide additional information, via the user device 20, to the drone computing system 16. In some embodiments, a drone control system 48 may act as a base system to coordinate multiple drones 50, upload the user profile(s), set initial flight commands (e.g., flight paths) in a coordinated manner, and the like. Thus, the drone control system 48 may send and/or upload instructions to the one or more drone computing systems 16 to coordinate flight patterns, so that an entire geographical area may be scanned for one or more codes on the physical targets 54 in an efficient manner.

It should be appreciated that the drone 50 may carry one or more items 56 for the user 52. The remote computing system 18 may select and/or designate the one or more items 56 for pick up by the drone 50 based on requests from the user 52 in the geographical area and/or based on the user profile for the user 52 in the geographical area (e.g., accessed via communication with the user device 20 and/or via an initial scan of the code in the geographical area via the drone 50). In some embodiments, the remote computing system 18 may select and/or designate the one or more items 56 for pick up by the drone 50 based on algorithms that determine (e.g., predict) the one or more items 56 that are appropriate (e.g., needed by the user 52) based on the user profile and/or characteristics of the event, such as a warm blanket for a snowstorm. In some embodiments, the algorithms may include artificial intelligence or machine learning algorithms that are trained on prior data (e.g., historical data, modeled data). Then, once the one or more items 56 are coupled to the drone 50, the drone 50 may travel through the geographical area and drop off the one or more items 56 at or near the physical target 54 with the code.

Various other techniques to deliver the one or more items 56 to the user 52 are envisioned. For example, the remote computing system 18 may select and/or designate the one or more items 56 for pick up by the drone 50 without any information about the user 52 in the geographical area, but instead based on characteristics of the event and/or other factors. Then, the drone 50 may transport the one or more items 56 through the geographical area and dispense the one or more items 56 in response to detecting the code on the physical target 54. The drone 50 may include a sorting device on-board, and the drone 50 may be configured to sort and select particular item(s) of the one or more items 56 based on the code (e.g., in real-time; in response to detecting the code and accessing the user profile based on the code) and/or based on the request from the user (e.g., sent via the user device 20, such as via Bluetooth). For example, the user profile and/or the request may indicate that the user 52 would like to obtain baby food for an infant in their household, and the drone 50 may select and dispense the baby food at or near the physical target 54 with the code. It should be appreciated that these techniques may be carried out for multiple users, such that the drone 50 is capable of delivering multiple items to multiple users in one trip through the geographical area and/or in multiple trips through the geographical area.

Figure 4:
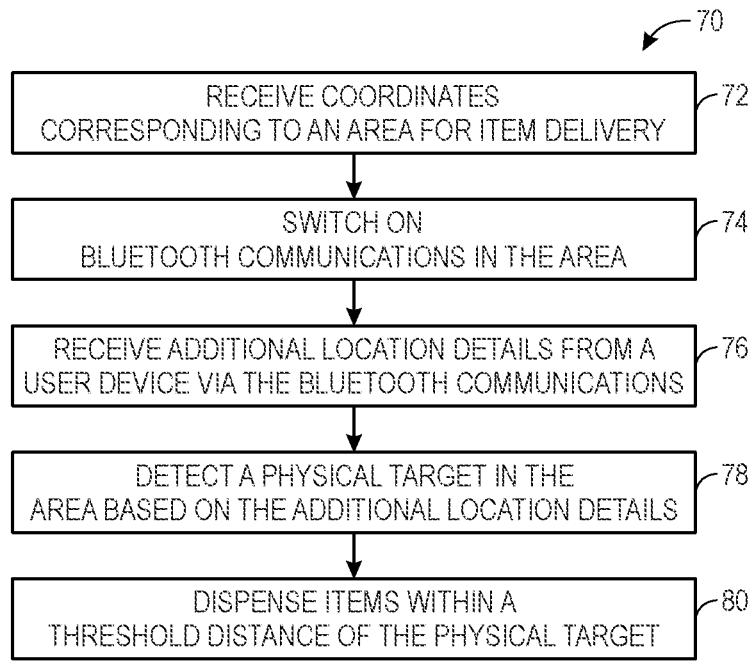
FIG. 4 illustrates a flow diagram of a method of operating a drone computing system to identify a physical target and dispense supplies at the physical target, in accordance with an embodiment of the present disclosure.

With the forgoing in mind, FIG. 4 illustrates a flow diagram of a method 70 of operating the drone computing system 16 to identify the code on the physical target 54 and to dispense the one or more items 56 at or near the physical target 54, in accordance with an embodiment of the disclosure. As discussed herein, the drone computing system 16 may be able to communicate with the user device 20 within a geographical area affected by an event using at least short-range (e.g., Bluetooth) communications, such as in the event that a long-range (e.g., Internet, cellular service)

connection is weak and/or non-existent as a result of the event. Additionally, the drone computing system 16 may receive initial instructions to monitor the geographical area from the drone control system 48 and/or the remote computing system 18.

The drone computing system 16, at block 72, receives coordinates from the drone control system 48 and/or the remote computing system 18 that correspond to a geographical area that has been identified for item delivery before, during, and/or after an event. The drone computing system 16 may receive the coordinates from the drone control system 48 and/or from the remote computing system 18 that may be associated with a response provider or other provider. The geographical area may have been identified based on event information and/or user location data analyzed by the remote computing system 18. For example, the remote computing system 18 may detect a winter storm has affected the geographical area within certain boundaries. The remote computing system 18 may cross-reference the geographical area with other data, such as residential addresses of users and/or last known location data of users (e.g., based on locations of their user devices). The remote computing system 18 may determine a target geographical area based on overlap between the geographical area and the data (e.g., participants eligible to receive support have residential addresses in the geographical area). The drone computing system 16 may then direct the drone 50 to the target geographical area.

The drone computing system 16, at block 74, may switch on communication ability, such as at least short-range (e.g., Bluetooth) communication ability, as the drone 50 travels within the target geographical area. This may enable one or more user devices 20 within the area to communicate with the drone computing system 16, such as even in weak cellular network and/or no cellular network conditions due to the event impact on cellular networks within the target geographical area.

The drone computing system 16, at block 76, may receive additional location details from the user device 20, such as via the short-range communications. The additional location details may include further location coordinates of the physical target 54 and/or other location information. For example, the additional location details may indicate where the user device 20 (and the user) is positioned relative to the physical target 54, and the drone computing system 16 may then instruct the drone 50 to drop off the items 56 within the range of the physical target 54 and also away from the user device 20 (e.g., outside of a respective range about the user device 20 so as not to be too close to the user 52) and/or near the user device 20 (e.g., inside of a respective range about the user device 20 to be easily accessible to the user 52). The additional location details may also trigger or direct the drone 50 to scan a particular region of the geographical area. For example, in response to connecting to the user device 20 via the short-range communications, the drone 50 may turn on its camera(s) 46 and/or continuously scan for the code in a vicinity of the user device 20 until the code is detected (or until some threshold time has passed, such as 5-10 minutes). The drone 50 may include the one or more cameras 46 that may collect image data within the target geographical area based on the additional location information received from the user device 20.

The drone computing system 16, at block 78, may identify the code on the physical target 54 within the geographical area based on analyzing image data. It should be appreciated that the drone computing system 16 may first detect the code on the physical target 54, as set forth in block 78, and then connect to the user device 20 via the short-range communications, as set forth in block 74. Indeed, the steps in the method 70 and any other methods disclosed herein may be carried out in any suitable order, certain steps may be omitted, and other steps may be added.

The drone computing system 16, at block 80, dispenses the one or more items 56 (e.g., emergency items) at the physical target 54 or near the physical target 54, such as within a threshold distance of the physical target 54. As set forth herein, the drone computing system 16 may also instruct the drone 50 to dispense the one or more items 56 based on the location of the user device 20. This method of communication with the one or more user devices 20 within an area is further explained with reference to FIG. 5.

Figure 5:
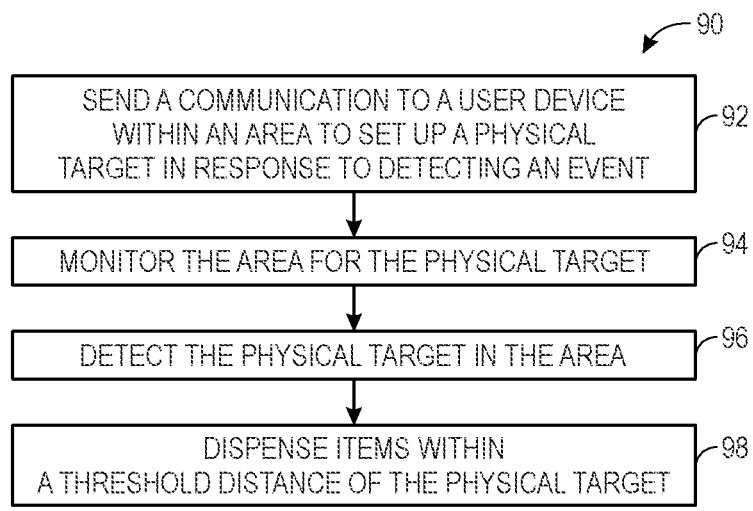
FIG. 5 illustrates a flow diagram of a method of operating a drone computing system to detect one or more physical targets in an area, in accordance with an embodiment of the present disclosure.

FIG. 5 illustrates a flow diagram of a method 90 of operating the drone computing system 16 to detect the code of the physical target 54 in a geographical area, in accordance with an embodiment of the disclosure. The remote computing system 18 may send communications to the user device 20 within the geographical area affected by an event. The communications may include instructions to display the physical target 54 with the code at the user location. The drone computing system 16 may analyze image data collected by the camera of the drone 50 to identify the physical target 54 within the geographical area. The drone 50 may then dispense the one or more items 56 (e.g., food, water, medication, first aid materials) at or near the physical target 54.

The drone computing system 16 and/or the remote computing system 18, at block 92, may send a communication over the network 12 to the user device 20 within a geographical area, and the communication may include instructions to set up the physical target 54 with the code in response to detecting an event at the geographical area. The drone computing system 16 may receive a notification of emergency conditions (e.g., flood, earthquake, winter storm) within the geographical area from the remote computing system 18 associated with a response provider and/or from the drone control system 48, which may provide a flight path to the drone 50 and/or coordinate the flight path of the drone 50 with other drones 50 during the event. Additionally, the user 52 associated with the user device 20 may have received the physical target 54 at a previous time from the response provider or other entity, and in response to receiving the communication may position the physical target 54 to be viewable by the drone 50 as the drone 50 travels through the geographical area.

The drone computing system 16, at block 94, may travel through the geographical area and may monitor the geographical area for the physical target 54. The drone computing system 16 may receive coordinates (e.g., boundaries and/or a flight path) corresponding to the geographical area to monitor from the remote computing system 18 and/or the drone control system 48. The remote computing system 18 may determine the coordinates based on analyzing resident location data and/or the geographical area affected by the event, for example. The remote computing system 18 may determine, based on this data, the geographical area for the drone 50 to monitor based on overlap between the resident location data and the geographical area affected by emergency conditions. In some embodiments, the drone computing system 16 may monitor an entirety of the geographical area affected by the event for the physical target 54. For example, in a national park area, no resident location information may be obtained, but campers and hikers (e.g., hunters, boaters) may still be located in the national park area. Therefore, it may be beneficial for the drone computing system 16 to control the drone 50 to monitor the entirety of the geographical rea corresponding to the event.

In some embodiments, the drone computing system 16 may direct the drone 50 to monitor a more precise region or location for the physical target 54. For example, a single camper and/or group of campers may be known to be lost in a wooded location (e.g., according to data from the user device 20). The drone computing system 16 (e.g., via following the flight path from the drone control system 48) may direct the drone 50 to maneuver to the wooded location to look for the physical target 54. Then, upon detection of the code on the physical target 54, the drone 50 may provide the one or more items 56 to the campers.

The drone computing system 16 may monitor the geographical area for the physical target 54 in any suitable manner, as discussed herein. The camera 46 of the drone 50 may continuously collect image data within the geographical area. The drone computing system 16, at block 96, may detect the physical target 54 within the geographical area by analyzing image data collected by the camera 46 of the drone 50. The drone computing system 16 may detect the code in the image data corresponding to the physical target 54.

In response to detecting the physical target 54, the drone computing system 16, at block 98, may dispense the one or more items 56 at or near the physical target 54, such as within a threshold distance (e.g., 10 meters, 20 meters, 30 meters) of the physical target 54. The one or more items 56 may include non-perishable food items, water, first aid equipment, medications, additional supplies, generators, fuel, firewood, covers/blankets, clothing, and the like. The one or more items 56 dispensed may also correspond to user specific medication and/or other supply lists stored in the one or more databases of the remote computing system 18. For example, the remote computing system 18 and/or the drone control system 48 may send a table that correlates the code to the user specific medication for the user 52. Thus, the drone computing system 16 may then analyze image data collected by the camera 46 of the drone 50, detect the code corresponding to the user 52, and deposit the user specific medication for the user 52 at or near the physical target 54 with the code so that the user 52 can access the user specific medication for the user 52.

The method 90 may be carried out for multiple users with multiple physical targets that each include a respective code. For example, the drone computing system 16 and/or the remote computing system 18 may send the communication as a broadcast to all user devices within range and/or within the geographical area. Then, the drone computing system 16 may control the drone 50 to monitor the geographical area for the multiple physical targets, and then to detect and dispense the one or more items 56 accordingly. As noted herein, it should be appreciated that the one or more items 56 may be the same generic items delivered to every physical target 54 detected and/or may be specific to the user (e.g., based on a user-generated supply list) identified based on the code of the physical target 54. Also, the drone computing system 16 may deliver items that are selected based on the location of the user 52, such as a first set of items if the user 52 is at the residence of the user 52 and a second set of items if the user 52 is not at the residence of the user 52 (e.g., at their vehicle stalled along a highway). It should be appreciated that the drone computing system 16 or the remote computing system 18 may select the items (e.g., in substantially real time) based on the location, or the drone computing system 16 or the remote computing system 18 may access and use multiple supply lists (e.g., created by the user; stored in a database) that are designated for use in delivering supplies to different locations and/or in different conditions. Advantageously, even without long-range communication available (e.g., without Wi-Fi or cellular service; without communicating with the remote computing system 18 and/or the drone control system 48), the drone computing system 16 may enable the drone 50 to travel, store user profiles, scan for codes, match the codes to the user profiles, select and/or dispense appropriate items (e.g., for the user, the event, and/or the location), communicate with user devices, and/or store (at least temporarily) information received from the user devices. For example, the drone computing system 16 may receive and store flight paths and/or flight boundaries from the remote computing system 18 and/or the drone control system 48. Then, the drone computing system 16 may travel into the geographic area where the long-range communication is not available. Further, the drone computing system 16 may automatically connect and/or communicate information (e.g., user confirmation of receipt of the appropriate items; flight paths traveled; codes detected, and the like on each trip into the geographical area) to the remote computing system 18 and/or the drone control system 48 upon the long-range communication or short-range communication with the remote computing system 18 and/or the drone control system 48 being made available (e.g., due to exiting the geographical area; due to proximity/range). However, it should be appreciated that the long-range communication between the drone computing system 16 and the remote computing system 18 and/or the drone control system 48 may remain intact during the supply delivery techniques disclosed herein.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure. It should be appreciated that features discussed with references to different examples provided herein may be combined. Features shown and described with reference to FIGS. 1-5 may be combined in any suitable manner.

The invention claimed is:

1. A supply delivery system, comprising:
   an autonomous aerial vehicle configured to supply at least one item to a target location;
   a processing system comprising a processor; and
   a memory device storing computer-readable instructions executable by the processing system to cause the processing system to:
      receive, via user-input of a user, a supply list comprising a plurality of items to be delivered to the user in response to an occurrence of an event condition, wherein the supply list is stored in association with the event condition in a database external to the autonomous aerial vehicle;
      identify a target geographical area impacted by an event;
      transmit, via a communication component of the supply delivery system and based on identifying the target geographical area, first instructions to cause the autonomous aerial vehicle to travel within the target geographical area and to capture image data using an imaging device carried by the autonomous aerial vehicle as the autonomous aerial vehicle travels through the target geographical area, wherein the autonomous aerial vehicle is configured to autonomously travel within the target geographical area and to capture image data based on receiving the first instructions;

transmit, via the communication component and based on identifying the target geographical area, second instructions to cause a user device within the target geographical area to provide a notification to display a physical target at a location associated with the user device;

receive the image data from the imaging device;

identify an identification code on the physical target based on image analysis of the image data, wherein the identification code is associated with the supply list;

in response to identifying the identification code, determine one or more deliverable items of the plurality of items of the supply list based on comparing the plurality of items of the supply list to a plurality of deliverable items carried by the autonomous aerial vehicle, wherein a respective quantity of the plurality of items of the supply list is greater than a respective quantity of the one or more deliverable items; and transmit, via the communication component, third instructions to cause the autonomous aerial vehicle to dispense the one or more deliverable items from the autonomous aerial vehicle at or near the physical target based on determining the one or more deliverable items, wherein the autonomous aerial vehicle is configured to dispense the one or more deliverable items at or near the physical target based on receiving the third instructions.

2. The supply delivery system of claim 1, wherein the processing system and the memory device are on-board the autonomous aerial vehicle, and wherein the computer-readable instructions are executable by the processing system to cause the processing system to initiate short-range communications between the autonomous aerial vehicle and the user device positioned proximate to the physical target.

3. The supply delivery system of claim 2, wherein the computer-readable instructions are executable by the processing system to cause the processing system to receive, from the user device, and to store, in the memory device, an indication of a user-input confirmation of receipt of the one or more deliverable items.

4. The supply delivery system of claim 3, wherein the computer-readable instructions are executable by the processing system to cause the processing system to communicate with the database to associate the user-input confirmation of the receipt of the one or more deliverable items with a user profile of the user associated with the user device, the identification code, or both.

5. The supply delivery system of claim 1, wherein the one or more deliverable items comprise food, water, first aid supplies, medication, or any combination thereof, and wherein the identification code comprises a quick response [QR] code, a bar code, an alphanumeric code, a symbol, or a color pattern.

6. The supply delivery system of claim 1, wherein the computer-readable instructions are executable by the processing system to cause the processing system to;
access, via the database, a user profile associated with the identification code based on identifying the identification code, wherein the user profile comprises the supply list;
receive the supply list based on determining that the event correlates to the event condition associated with the supply list; and
determine the one or more deliverable items from the plurality of deliverable items carried by the autonomous aerial vehicle based at least in part on the supply list.

7. The supply delivery system of claim 1, wherein the computer-readable instructions are executable by the processing system to cause the processing system to:
access, via the database, a user profile associated with the identification code based on identifying the identification code, wherein the user profile comprises the supply list;
receive position coordinates of the physical target from a sensor carried by the autonomous aerial vehicle;
compare the position coordinates of the physical target to a residence location in the user profile to determine whether the position coordinates of the physical target correspond to the residence location; and
dispense, via the autonomous aerial vehicle, the one or more deliverable items at or near the physical target based at least in part on whether the position coordinates of the physical target correspond to the residence location.

8. The supply delivery system of claim 1, wherein the computer-readable instructions are executable by the processing system to cause the processing system to:
determine that the user device is within the target geographical area based on a last received location of the user device; and
receive a flight path to the last received location of the user device, wherein the last received location of the user device indicates that a user associated with the user device was likely in the target geographical area during the event, and wherein the first instructions are configured to cause the autonomous aerial vehicle to follow the flight path to the last received location and to scan for the identification code on the physical target as the autonomous aerial vehicle follows at least a portion of the flight path, and wherein the autonomous aerial vehicle is configured to travel the flight path to the last received location and to scan for the identification code on the physical target as the autonomous aerial vehicle travels at least the portion of the flight path based on receiving the first instructions.

9. The supply delivery system of claim 1, wherein the computer-readable instructions are executable by the processor to cause the processor to:
identify an additional identification code on an additional physical target based on the image analysis of the image data; and
transmit, via the communication component, fourth instructions to cause the autonomous aerial vehicle to dispense one or more additional items from the autonomous aerial vehicle at or near the additional physical target based on identifying the additional identification code, wherein the autonomous aerial vehicle is configured to dispense the one or more additional items at or near the additional physical target based on receiving the fourth instructions.

10. The supply delivery system of claim 1, wherein the physical target comprises one of a blanket, a tarp, a flag, or a plate, and wherein the identification code is printed or woven onto a surface of the physical target.

11. The supply delivery system of claim 1, wherein the computer-readable instructions are executable by the processing system to cause the processing system to:
receive a plurality of coordinates defining an event geographical area affected by the event;

receive location data comprising a plurality of residential addresses associated with one or more supply delivery participants, a plurality of current locations associated with the one or more supply delivery participants, a plurality of last known locations associated with the one or more supply delivery participants, or a combination thereof; and identify the target geographical area as an overlapping geographical area comprising at least a portion of the location data that is within the event geographical area.

12. A method of operating a supply delivery system, the method comprising:

receiving, via user-input, a supply list comprising a plurality of items to be delivered to a user in response to an occurrence of an event condition, wherein the supply list is stored in association with the event condition in a database;

identifying, via one or more processors, a target geographical area impacted by an event;

transmitting, via a communication component associated with the one or more processors, first instructions to cause an autonomous aerial vehicle to travel within the target geographical area and to capture image data using an imaging device carried by the autonomous aerial vehicle as the autonomous aerial vehicle travels through the target geographical area in response to identifying the target geographical area;

autonomously traveling, via the autonomous aerial vehicle, within the target geographical area and capturing image data based the autonomous aerial vehicle on receiving the first instructions;

transmitting, via the communication component, second instructions to cause a user device associated with the user within the target geographical area to provide a notification to display a physical target at a location associated with the user device in response to identifying the target geographical area;

receiving, via the one or more processors, the image data from the imaging device;

identifying, via the one or more processors, an identification code on the physical target based on image analysis of the image data;

in response to identifying the identification code, determining, via the one or more processors, one or more deliverable items of the plurality of items of the supply list based on comparing the plurality of items of the supply list to a plurality of deliverable items carried by the autonomous aerial vehicle, wherein a respective quantity of the plurality of items of the supply list is greater than a respective quantity of the one or more deliverable items;

transmitting, via the communication component, third instructions to cause the autonomous aerial vehicle to dispense the one or more deliverable items at or near the physical target based on determining the one or more deliverable items; and dispensing, via the autonomous aerial vehicle, the one or more deliverable items at or near the physical target based on the autonomous aerial vehicle receiving the third instructions.

13. The method of claim 12, comprising initiating, via the one or more processors, short-range communications between the autonomous aerial vehicle and the user device positioned proximate to the physical target.

14. The method of claim 13, comprising receiving, at the one or more processors and from the user device, an indication of a user-input confirmation of receipt of the one or more deliverable items.

15. The method of claim 14, comprising updating, via the one or more processors, the database to associate the receipt of the one or more deliverable items with a user profile of the user associated with the user device, the identification code, or both.

16. The method of claim 12, wherein the one or more deliverable items comprise food, water, first aid supplies, medication, or any combination thereof.

17. The method of claim 12, wherein the identification code comprises a quick response [QR] code, a bar code, an alphanumeric code, a symbol, or a color pattern.

18. The method of claim 12, comprising:

accessing, via the database, a user profile associated with the identification code based on identifying the identification code, wherein the user profile comprises the supply list;

receiving, at the one or more processors, the supply list based on the event correlating to the event condition associated with the supply list; and determining, via the one or more processors, the one or more deliverable items from the plurality of deliverable items carried by the autonomous aerial vehicle based at least in part on the supply list.

19. A supply delivery system, comprising:

an autonomous aerial vehicle configured to supply at least one item to a target location;

a processing system comprising a processor; and a memory device storing computer-readable instructions executable by the processing system to cause the processing system to:

receive, via user-input, a supply list comprising a plurality of items to be delivered to a user in response to an occurrence of a first event condition, wherein the supply list is stored in association with the first event condition in a database external to the autonomous aerial vehicle;

receive an indication of a geographical area impacted by an event, wherein the indication comprises a second event condition correlating to the event;

transmit, via a communication component of the supply delivery system and based on receiving the indication, first instructions to cause the autonomous aerial vehicle to follow a flight path through the geographical area and to capture image data using an imaging device carried by the autonomous aerial vehicle as the autonomous aerial vehicle follows the flight path, wherein the autonomous aerial vehicle is configured to autonomously navigate the flight path and to capture image data based on receiving the first instructions;

transmit, via the communication component and based on receiving the indication, second instructions to cause a user device associated with the user within the geographical area to provide a notification to display a physical target comprising an identification code associated with the user;

receive the image data from the imaging device;

identify the identification code based on image analysis of the image data;

access, via the database, a user profile of the user based on identifying the identification code and select the supply list based on the first event condition corresponding to the second event condition, wherein the user profile comprises the supply list;

in response to selecting the supply list, determine a subset of deliverable items of the plurality of items of the supply list based at least in part on comparing the plurality of items of the supply list and a plurality of deliverable items carried by the autonomous aerial vehicle, wherein a respective quantity of the plurality of items of the supply list is greater than a respective quantity of the subset of deliverable items; and transmit, via the communication component, third instructions to cause the autonomous aerial vehicle to dispense the subset of deliverable items from the autonomous aerial vehicle within a threshold distance of the physical target, wherein the autonomous aerial vehicle is configured to dispense the subset of deliverable items within the threshold distance of the physical target based on receiving the third instructions.

20. The supply delivery system of claim 19, wherein the processing system and the memory device are on-board the autonomous aerial vehicle.

\* \* \* \* \*